(12) United States Patent
Vasconcelos De Almeida et al.

(10) Patent No.: US 12,448,822 B2
(45) Date of Patent: Oct. 21, 2025

(54) MOVEMENT DETECTION DEVICE

(71) Applicant: Continental Automotive Technologies GmbH, Hannover (DE)

(72) Inventors: Joao Carlos Vasconcelos De Almeida, Toulouse (FR); Saïd Bouguern, Toulouse (FR); Mohamed Zied Bach Baouab, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 128 days.

(21) Appl. No.: 18/380,372

(22) Filed: Oct. 16, 2023

(65) Prior Publication Data

US 2024/0141704 A1 May 2, 2024

(30) Foreign Application Priority Data

Oct. 26, 2022 (FR) ...................... 2211103

(51) Int. Cl.
| | |
|---|---|
| *E05B 81/76* | (2014.01) |
| *E05B 81/78* | (2014.01) |
| *H01Q 7/00* | (2006.01) |
| *H04B 5/22* | (2024.01) |
| *H04B 5/73* | (2024.01) |

(52) U.S. Cl.
CPC .............. *E05B 81/77* (2013.01); *E05B 81/78* (2013.01); *H04B 5/22* (2024.01); *H04B 5/73* (2024.01); *E05Y 2900/531* (2013.01); *H01Q 7/00* (2013.01)

(58) Field of Classification Search
CPC ........... E05B 81/77; E05B 81/78; H04B 5/22; H04B 5/73; E05Y 2900/531; H01Q 7/00; G07C 9/00309; G07C 2209/65; H03K 17/9622; H03K 2217/94052; H03K 2217/96066; H03K 2217/960775; H03K 17/9545; G01V 3/00; G01D 5/16
See application file for complete search history.

(56) References Cited

U.S. PATENT DOCUMENTS

| | | | |
|---|---|---|---|
| 9,274,075 B2 | 3/2016 | Wang et al. | |
| 2019/0220123 A1 | 7/2019 | Kanaya | |
| 2021/0066802 A1* | 3/2021 | Liu .......................... | H04B 5/26 |

(Continued)

FOREIGN PATENT DOCUMENTS

JP 5814624 A 1/1983

*Primary Examiner* — Omeed Alizada
(74) *Attorney, Agent, or Firm* — Buchanan Ingersoll & Rooney PC

(57) ABSTRACT

A device for detecting the movement of part of a user's body and/or the approach of a portable user device. The device placed on board a motor vehicle. The device includes: a near field communication antenna having a resonance frequency between 3 and 30 MHz, including at least one continuous winding in the form of at least two sets of strips, each having different variable capacitance and different sensitivity, connected in parallel with the antenna. The antenna generating a different variation of impedance on the approach of part of a user's body towards the first or second set; a device measures a variation of impedance of the antenna. The device has a high series resonance frequency and detects the approach of a portable user device or movement of the body part taking place consecutively in front of the first and then in front of the second set of strips.

13 Claims, 3 Drawing Sheets

(56) References Cited

U.S. PATENT DOCUMENTS

| | | |
|---|---|---|
| 2021/0122334 A1* | 4/2021 | Spick .................. H01Q 1/3241 |
| 2021/0175930 A1* | 6/2021 | Vassilieff ................. G01V 3/10 |
| 2022/0195759 A1 | 6/2022 | Mensch et al. |

* cited by examiner

MOVEMENT DETECTION DEVICE

CROSS REFERENCE TO RELATED APPLICATIONS

This application claims priority to French Patent Application No. 2211103, filed Oct. 26, 2022, the contents of such application being incorporated by reference herein.

FIELD OF THE INVENTION

The invention relates to a movement detection device. More particularly, the invention is applicable to the detection of the movement of a hand and/or to the approach of an intelligent mobile phone (smartphone) toward a bodywork element of a motor vehicle, such as a handle of an openable section or a pillar of an openable section (door or trunk), for the purpose of unlocking the openable section.

BACKGROUND OF THE INVENTION

Nowadays, vehicle door handles are equipped with devices for detecting the movement of a user's hand or of a smartphone. The openable sections of the vehicle can be locked and unlocked by the detection of the movement of a part of a user's body, for example the sweeping movement of a user's hand past the handle at a distance of several centimetres therefrom, coupled with the recognition of a portable user device, for example a "hands-free" electronic fob for remote access control, carried by said user. Thus, when the user, carrying the corresponding electronic fob and identified by the vehicle, wishes to unlock the vehicle, he performs a sweeping movement past the vehicle door handle, from left to right for example, this movement then actuates an electric lock in the locking system of the openable section or sections of the vehicle which is/are then automatically unlocked. By performing this precise sweeping movement past the vehicle door handle, called the "unlocking area" the door (or alternatively all the openable sections) is/are unlocked without any other action by the user. Conversely, when the user, still carrying the requisite fob and identified by the vehicle, wishes to lock his vehicle, he shuts the door of his vehicle and performs a sweeping movement in a similar manner across another area of the handle, called the "locking area", or performs another movement, for example a reverse movement from right to left with respect to the same area as the unlocking area, in which case there is a single area for locking and unlocking. This movement enables the openable sections of the vehicle to be locked automatically.

These devices for detecting the movement of a hand for unlocking/locking usually comprise at least two capacitive sensors, in the form of two electrodes, electrically connected to a printed circuit, integrated into the door handle.

This device for detecting the movement of a hand further comprises a radiofrequency, usually LF (low frequency), antenna, although this antenna may also be a high or ultra-high frequency antenna of the UWB, BLE Wifi, 4G, 5G type, of the NFC (near field communication) type, that is to say any antenna or communication device for exchanging an identifier with the mobile phone in order to authenticate it.

The detection device also comprises an electronic computer of the vehicle (ECU: abbreviation for "electronic control unit") which receives a movement detection signal from the capacitive sensors. The vehicle's computer has previously identified the user as being authorized to access the vehicle; alternatively, it proceeds to perform this identification after receiving this presence detection signal. To this end, it sends an identification request via the radio frequency antenna to the fob (or remote controller) carried by the user. This fob responds by sending its identification via RF (radio frequency), NFC, UWB, Wifi, BLE, or other type of radiation to the vehicle computer. If the computer recognizes the identification code as the one authorizing access to the vehicle, it triggers the locking/unlocking of the door (or of all of the openable sections). However, if the computer has not received an identification code, or if the received identification is erroneous, the locking or unlocking does not take place.

On the other hand, when the approach of a smartphone is to be detected, the detection device comprises a known NFC (near field communication) reader, so as to detect, by radio frequency exchange at 13.56 MHz, the presence of a smartphone in the vicinity, the smartphone also being equipped with near field communication means and being capable of receiving the identifier of said telephone, in order to ensure that it is correctly recognized as being paired with the vehicle so that the locking/unlocking can proceed. This NFC reader is connected to a dedicated microcontroller.

Such vehicles are therefore equipped with door handles each comprising a detection device equipped with a radio frequency antenna, with two electrodes connected to a first capacitive detection microcontroller dedicated to the detection of the movement of a hand, and with an NFC reader, itself connected to a second microcontroller dedicated to the detection by NFC of a smartphone, the whole being integrated into a printed circuit.

However, the integration of all these electronic components poses a problem concerning the overall dimensions of the door handle, and entails significant added costs. Furthermore, NFC detection is not reliable when smartphones have a very low content of metal, for example when they have plastic shells, or when the portable access device is a "tag", that is to say a fob consisting almost entirely of plastic.

SUMMARY OF THE INVENTION

An aspect of the invention therefore proposes a movement detection device capable of overcoming the drawbacks of the prior art. More particularly, an aspect of the invention proposes a simple and inexpensive device for the detection of both the sweeping movement of a hand past the handle and the approach of a smartphone towards the handle, using only the technology of NFC, that is to say near field communication.

An aspect of the invention relates to a device for detecting the movement of part of a user's body and/or the approach of a portable user device, the device being intended to be placed on board a motor vehicle and being remarkable in that it comprises:

a. a near field communication antenna configured for transmitting and receiving signals at a high frequency with a selected resonance of between 3 and 30 MHz, said antenna comprising at least one winding which is prolonged continuously in the form of at least two sets of strips, a first set and a second set being connected in parallel with said antenna in such a way that said two sets each have a different variable capacitance and sensitivity, said antenna being capable of generating a different variation of impedance on the approach of part of a user's body towards the first or second set, b. means of measurement by the electromagnetic coupling to said antenna of a variation of impedance or of a variation of resonance frequency of said antenna, the measurement means having a series resonance frequency at the selected high resonance frequency and being capable of detecting the approach of a portable user device or the movement of part of a user's body taking place consecutively past the first and then past the second set of strips by means of the generated impedance variation.

Preferably, said sets of strips each comprise two subsets of strips interconnected in the form of a comb.

In one embodiment, the winding delimits a perimeter inside which said antenna is prolonged continuously in the form of at least two sets of strips, each comprising two subsets of interconnected strips, each in the form of a comb.

Since the perimeter is rectangular, the strips of the same set may take the form of conductive metal tracks perpendicular to a length or a width of the perimeter.

Preferably, the strips of the same subset are identical to each other.

Advantageously, the strips of two subsets of the same set are interleaved with each other.

Advantageously, the two sets of strips differ from each other in the shape and/or width and/or length and/or thickness of the strips.

It is advisable for the measurement means to comprise a second antenna electromagnetically coupled to the communication antenna In an improvement of an aspect of the invention, the device comprises a third antenna connected in series to the communication antenna and electromagnetically coupled to the second antenna.

An aspect of the invention is applicable to any door handle, rear view mirror or door of a vehicle comprising a detection device according to any of the characteristics mentioned above.

Finally, an aspect of invention relates to any motor vehicle comprising a device according to any of the characteristics mentioned above.

BRIEF DESCRIPTION OF THE DRAWINGS

Other features and advantages of aspects of the invention will become more apparent upon reading the description that follows. This description is purely illustrative and should be read with reference to the appended drawings, in which.

DESCRIPTION OF THE PREFERRED EMBODIMENTS

Figure 5:
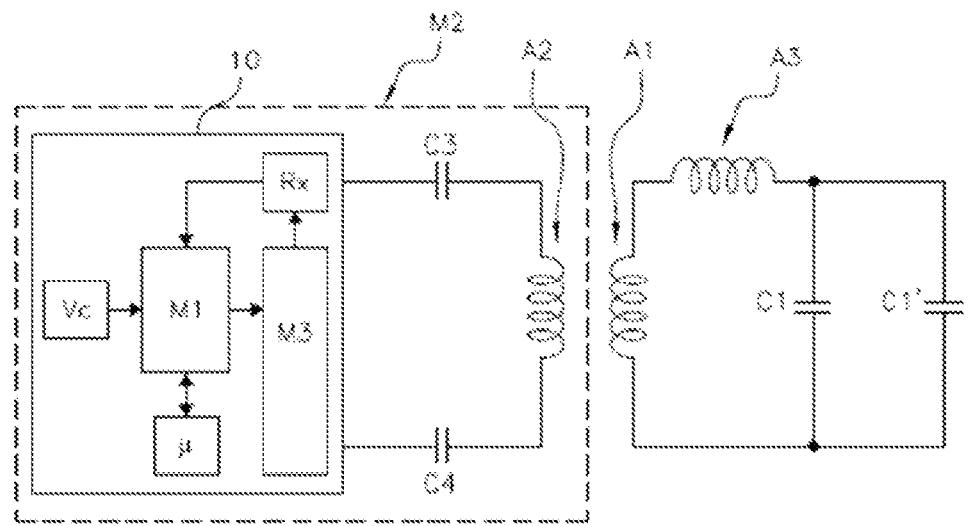
FIG. 5 is a schematic electronic representation of the movement detection device according to an aspect of the invention.

The device D for detecting the movement of part of a user's body and the approach of a portable user device 200 is illustrated in FIG. 5.

The device D comprises a near field communication antenna A1, having a selected parallel resonance frequency of between 3 and 30 MHz, at 13.56 MHz for example, capable of detecting and communicating with a portable user device, for example a smartphone 200 or a fob (or "tag") provided with NFC communication technology. This type of NFC antenna A1 is associated with a microprocessor and software or other electronic means so that it can exchange data with the portable user device.

The approach of a portable user device 200 towards the detection device D is detected by measuring the variation of impedance or the variation of the resonance frequency of the NFC antenna A1, using the measurement means M2. This is known from the prior art.

The measurement means M2 determine, by electromagnetic coupling with said NFC antenna A1, a variation of impedance or a variation of resonance frequency of said NFC antenna A1.

For this purpose, and according to an aspect of the invention, the measurement means M2 comprise a second remote antenna A2, located facing the NFC antenna A1, which has a series resonance frequency equal to the selected parallel resonance frequency of the communication antenna A1, that is to say in the vicinity of 13.56 MHz. The measurement means M2 are capable of detecting not only the approach of a portable user device 200, but also, according to an aspect of the invention, the movement of part of the user's body, for example a hand M facing the detection device, as will be explained below.

An aspect of the invention proposes that the NFC antenna A1 comprise at least one winding E1, E2, E3 and that it be prolonged continuously in the form of at least two sets G1, G2 of strips, preferably in the form of a comb, denoted (O1, O2 . . . Oi, and N1, N2 . . . Ni) and (P1, P2 . . . Pi and Q1, Q2, . . . Qi) respectively, in which, as specified below, the two sets G1, G2 each act as a detection electrode by creating a variable capacitance C1, C1' connected to the NFC antenna A1.

The term "strips" denotes conductive metal tracks, made of copper or gold or metal-coated, for example, of predetermined width, for example flattened copper wires or strips, which are interconnected and form indentations, protrusions, offshoots or prolongations of the NFC antenna A1, which itself consists of a conductive metal strip.

The shape of the strips is not limited to a rectangular shape, and the strips may be square, oval, zigzag shaped, not symmetrical to each other, etc.

The NFC antenna A1 may comprise a plurality of windings E1, E2, E3 of square, rectangular, oval or round shape.

Figure 1:
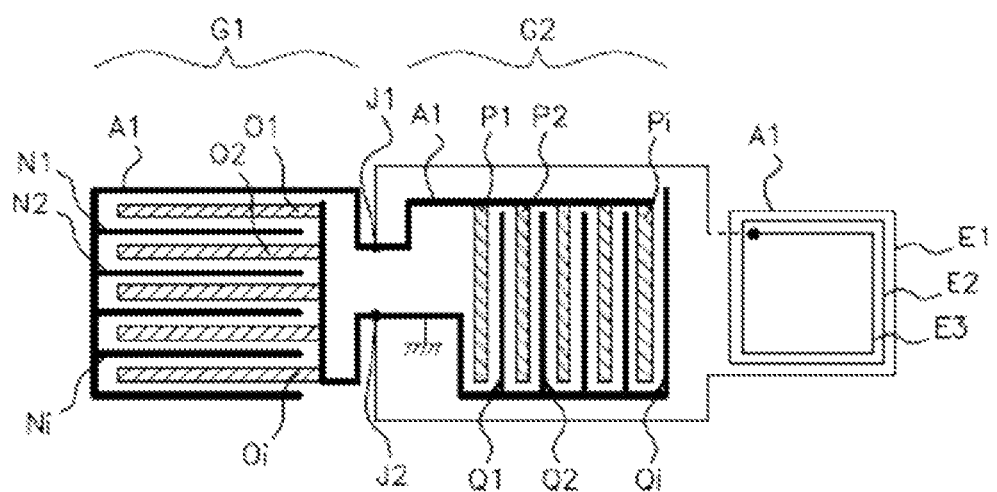
FIG. 1 is a schematic representation of a first embodiment of the communication antenna of the movement and approach detection device according to the invention.
Figure 4:
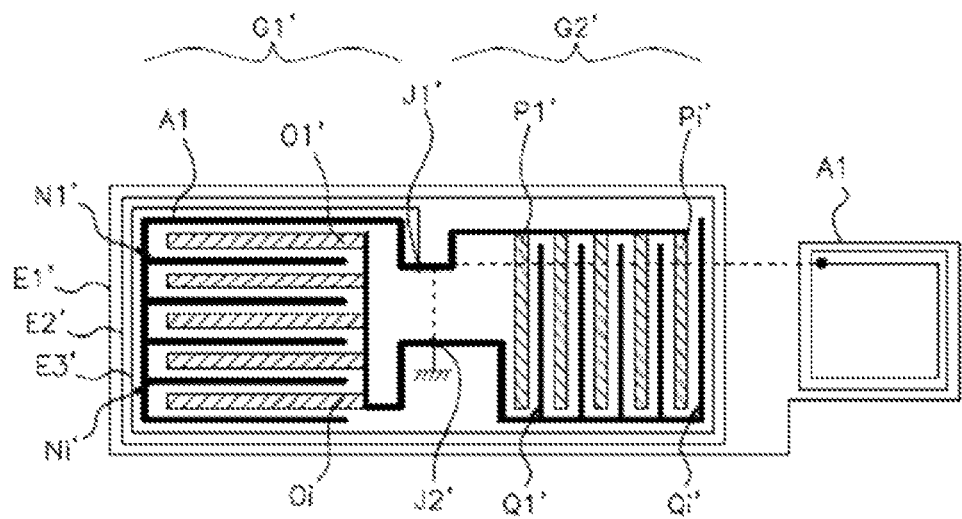
FIG. 4 is a schematic representation of a second preferred embodiment of the movement detection device according to the invention.

In FIGS. 1 and 4, solely for explanatory purposes, the windings E1, E2, E3 of the NFC antenna A1 are three in number and are shown as being rectangular in shape, although this is not limiting.

In FIG. 1, according to the first embodiment, the NFC antenna A1 comprises three windings E1, E2, E3. The NFC antenna A1 is prolonged via two connections J1, J2, forming two sets G1, G2 of strips, the first set G1 comprising the strips O1, O2, . . . Oi and N1, N2, . . . Ni and the second set G2 comprising the strips P1, P2 . . . Pi and Q1, Q2 . . . Qi. In this example, the strips O1, O2, . . . Oi or P1, P2 . . . Pi or N1, N2, . . . Ni or even Q1, Q2 . . . Qi of each respective set G1, G2 form comb-shaped subgroups, whose strips are identical and parallel to each other. In this first embodiment, the two sets G1, G2 of conductive metal strips are each connected in parallel to the NFC antenna A1, and these two sets each form a conductive surface acting as an electrode with a variable capacitance C1, C1', as detailed below.

Evidently, the strips O1, O2, . . . Oi and N1, N2, . . . Ni or P1, P2 . . . Pi, and Q1, Q2 . . . Qi may be inclined along an axis parallel to a length or to a width of a rectangular winding E1, E2, E3 of the NFC antenna A1, said strips may have widths that differ from each other, and/or geometries that differ from each other, and/or spacings that differ from each other. The main feature of an aspect of the invention is the addition of two conductive metal surfaces, made of copper and connected in parallel with the NFC antenna A1 for example, in order to create two additional variable capacitances C1, C1' in the circuit.

The comb shape is a preferred shape which prevents the flow of eddy currents in the conducting surfaces and permits more precise and more reliable detection.

As detailed below, it is important for the variable capacitances C1, C1' added in this way to have different values and sensitivities from each other. Consequently, the sets of strips G1, G2 are not identical to each other.

"Sensitivity" is taken to mean the variation in capacitance caused by the approach of a hand over a given distance. It is an intrinsic characteristic of an electrode, known to those skilled in the art.

In a second embodiment of the detection device D according to the invention, which is illustrated in FIG. 4 in an entirely nonlimiting way, the winding(s) E1', E2', E3' delimit a perimeter within which said NFC antenna A1' is prolonged continuously in the form of at least two sets G1', G2' of strips in the shape of a comb, this example featuring two subgroups of strips O1', O2', O3' . . . Oi' and N1', N2', N3' . . . Ni' for the first set G1, and two subgroups of strips P1', P2' . . . Pi' and Q1', Q2' . . . Qi' for the second set of strips G2, each of the subgroups being comb-shaped as illustrated in FIG. 4.

In FIG. 4, according to this second embodiment of the invention, within a rectangular perimeter defined by the windings E1' E2', E3' of the NFC antenna A1', the NFC antenna A1' comprises two sets of strips G1', G2', each comprising two subsets of strips, O1', O2' . . . Oi' and N1', N2', N3' . . . Ni' and P1 P2 . . . Pi and Q1', Q2' . . . Qi' respectively, each resembling a comb. The two subsets of the first set G'1, namely O1', O2' . . . Oi' and N1', N2', N3' . . . Ni', are parallel to a length of the perimeter, and the two subsets of the second set G2', namely P1 P2 . . . Pi and Q1', Q2' . . . Qi', are perpendicular to said length of the perimeter. Each strip of a subset of the first set G1, namely O1', O2', . . . Oi', or of the second set G2, namely P1', P2.' . . . Pi', is interleaved with a strip of the other subset belonging to the same set, namely N1', N2', N3' . . . Ni' or Q1', Q2' . . . Qi' respectively.

Evidently, the sets may be arranged in an identical manner, with strips perpendicular or parallel to the length of the perimeter, but the variable capacitances C1, C1' and the capacitive sensitivities of the sets of electrodes that are generated must be different from each other. The sets G1, G2 must therefore differ in the geometry of the strips and/or in the amount of copper surface.

FIG. 4 shows a preferred embodiment of the invention, wherein the two subgroups of the two sets G1, G2 each contain five strips O1', O2', . . . and N1', N2' . . . , P1', P2' . . . and Q1', Q2' . . . which are parallel to each other and connected in parallel with the NFC antenna A1 at two connections 31', J2', of which one connection J2' is connected to ground. The strips O1', O2', O3' are interconnected and connected to the junction point 31', and the strips N1', N2' are interconnected and connected to the junction point J2'. The strips P1', P2' . . . Pi are interconnected and are connected to the junction point 31', and the strips Q1', Q2' are also interconnected, but are connected to the junction point J2'.

It should be noted that the sets made up of these electrodes in the shape of combs are not necessarily connected to ground. The applicant has discovered that an aspect of the invention would operate equally well with floating capacitances, that is to say sets of strips not connected to ground but connected in parallel with the NFC antenna A1.

In FIG. 4, the NFC antenna A1 is connected to ground at one of its sides, for example at the points J2, J2' as illustrated in FIGS. 1 and 4.

Similarly, in this second embodiment, the two sets of strips G1', G2' each form a conductive surface acting as a variable capacitance C1, C1'.

In order to detect the movement of a user's hand M past the device D, the detection device D further comprises, as mentioned above, measurement means M2 capable of measuring a variation of impedance or a variation of resonance frequency of said NFC antenna A1.

The measurement means M2 are illustrated in FIG. 5. Said measurement means M2 comprise a voltage source Vc, an NFC driver M1, connected to a microcontroller p, and a matching circuit M3 comprising at least one EMC (electromagnetic compatibility) filter and means of adjusting the impedance and frequency of the coupled NFC antenna A1, in the form of two capacitances C3 and C4 which are connected to the second antenna A2. The measurement means M2 also comprise a receiver circuit Rx dedicated to receiving data from the NFC antenna A1. The two capacitances C3 and C4 are matching capacitances for creating a series resonance in the circuit of the measurement means M2, and more particularly for the second antenna A2, by lowering its impedance to the desired resonance frequency. Thus, by electromagnetic coupling between the NFC antenna A1 and the second antenna A2, any variation in the parallel resonance frequency and/or the impedance of the circuit formed by the NFC antenna A1 and the variable capacitance electrodes C1 and C1' may be measured by the measurement means M2.

Said measurement means M2 are separated and disconnected from the NFC communication antenna A1. The NFC communication antenna A1 and the second antenna A2 are placed facing each other so as to create electromagnetic coupling between the two antennas A1, A2. Since the measurement means M2 have a series resonance frequency substantially equal to the resonance frequency F of the NFC communication antenna A1, any variation of impedance or resonance frequency of the NFC communication antenna A1, caused by:

a. either the variation of capacitance created by the movement of a user's hand M past one subset of electrodes G1 and then past the other G2, in a sweeping movement from right to left, left to right, downwards or upwards according to the arrangement of the subsets located facing the user frontally, b. or the variation of impedance Z generated by the approach of a portable user device 200 towards the detection device D, is transmitted to the second antenna A2 by electromagnetic coupling.

The means M2 for measuring a variation of impedance Z or a variation of resonance frequency comprise, for example, software means contained in an NFC driver M1, and measure any variation of the phase, the current or the voltage of the second antenna A2 caused by the variation of the impedance or resonance frequency of the NFC antenna A1. More precisely, any change in the impedance or resonance frequency of the NFC antenna A1, or in a characteristic parameter of the resonance frequency, due to the approach of a portable device 200 or the movement of a user's hand M past each of the two subsets of electrodes G1, G2 consecutively, is passed on to the second antenna A2 and is measured by the measurement means M2.

The NFC communication antenna A1, thus modified relative to the prior art, has two sets G1, G2 of conductive metal strips, and therefore has two variable capacitances C1, C1', so that it is clearly superior to the intrinsic parasitic residual capacitance of the prior art NFC antenna, and is sensitive not only to the movement of a hand M, as detailed below, among other things, but also to the approach of any object.

Said variable capacitances C1, C1' generated in this way can then be measured by measuring the variation of impedance Z of the circuit of the measurement means M2, and make it possible to detect the movement of part of a user's body, for example the movement of a user's hand M which passes successively past a first set G1 of strips and then past the second set G2 of strips, while being close enough to the two sets to create a variation of capacitance of the two sets of electrodes G1, G2.

Thus, the NFC antenna A1 according to an aspect of the invention is capable of generating two variations of capacitance having different values from each other, namely a first variation of capacitance C1 when a user's body part moves past the first set G1, then another variation of capacitance C1' when the body part then moves consecutively past the second set G2, the two variations of capacitance C1, C1' being measurable by measuring the two variations of impedance resulting from them, this measurement being made by the measurement means M2 which are adapted to resonate at the same resonance frequency as said NFC antenna A1.

Figure 2:
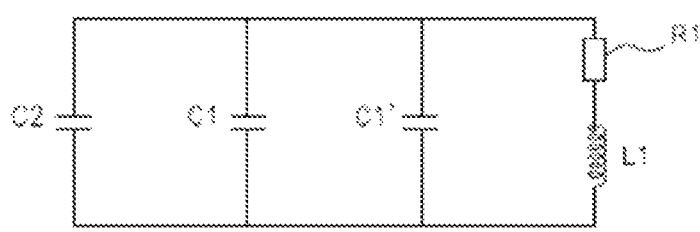
FIG. 2 is an equivalent circuit diagram of the modified near field communication antenna according to an aspect of the invention.

FIG. 2 shows schematically the equivalent electrical circuit of the NFC antenna A1 modified in this way. The circuit is an RLC ("resistance, inductance and capacitance") circuit consisting of a first branch, comprising a resistance R1 representing the losses of the NFC antenna A1 connected to an inductance L1 (representing the NFC antenna A1), and a second branch, comprising a first capacitance C1 representing the variable capacitance of the electrode formed by the first set of strips G1, and a second variable capacitance C1' representing the variable capacitance of the electrode formed by the second set of strips G2. An optional third branch comprising an adjustment capacitance C2 has been added, the four branches being connected in parallel with each other. The variable capacitances C1, C1' are generated by means of the electrodes connected in parallel with the NFC antenna A1 and made in the form of sets G1, G2 of conductive metal strips of the modified NFC antenna A1. The values of the inductance L1 and the capacitances C1, C1' are adapted so that the circuit consisting of L1, C1 and C1' (and C2, if present) resonates at the parallel resonance of 13.56 MHz.

The RLC circuit formed in this way is sensitive not only to the approach of a portable user device 200, but also to the approach and movement of part of the user's body, for example his hand M.

This is because, during the approach of a portable user device 200, inductive coupling (between the NFC antenna of the portable user device 200 and the NFC antenna A1 of the detection device D) and capacitive coupling are created between said device 200 and the detection device D, causing a variation in the value of each of the three parameters, that is to say the value of the resistance R1, the value of the variable capacitances C1, C1' and the value of the inductance L1.

The variation of these parameters R1, L1, C1, C1' causes a notable change in the impedance Z of the NFC antenna A1 and/or in its resonance frequency, that is to say a "mismatching", which is transmitted to the second antenna A2 by electromagnetic coupling and then measured by the measurement means M.

The consecutive movement of a hand M past the first set G1 and then past the second set G2 initially creates a variation of the first variable capacitance C1 and then creates a variation of the variable capacitance C1'.

The variations of capacitance C1, C1' cause variations of impedance Z in the NFC antenna A1, which are measured by the measurement circuit M2.

Figure 6:
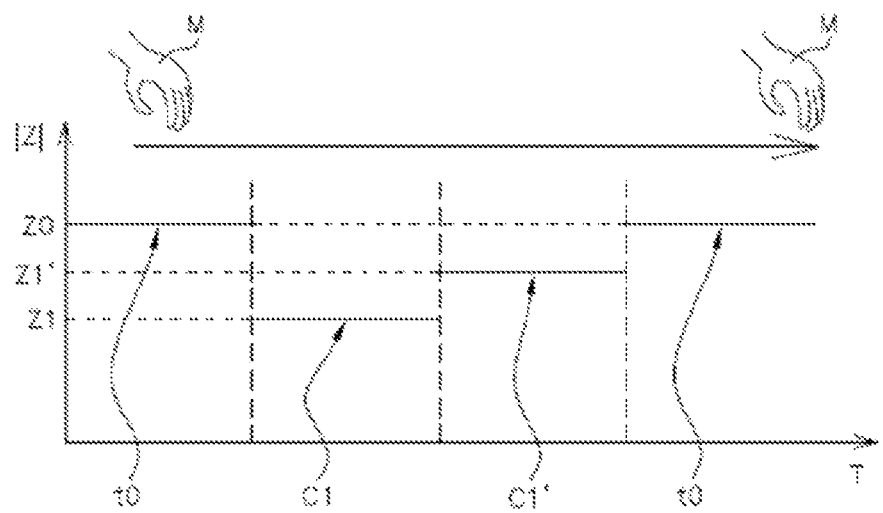
FIG. 6 is a graph showing the impedance of the communication antenna as a function of time, and the variations of impedance measured during a sweeping movement of part of a user's body past the detection device.

This is illustrated in FIG. 6, which represents the impedance Z of the NFC antenna A1 as a function of time t, measured by the measurement means M2.

In an initial phase t0, when there is no portable device 200 or hand M in the proximity of the detection device D, the impedance of the NFC antenna A1 has an initial value Z0.

The movement of a user's hand M past the first set G1 generates a first variation of impedance Z, due to the capacitive coupling with the first variable capacitance C1; in this example, the value of the impedance decreases to a value Z1. When the user moves his hand M in a sweeping movement and shifts it to make it pass over the second set G2, a second variation of impedance is created, due in this case to the capacitive coupling with the second variable capacitance C1', the impedance in this example increasing slightly to a value Z1'.

The values of impedance are provided here solely by way of example, and will in fact depend on the value of the variable capacitances C1, C1', because of the geometric configurations of the chosen subsets G1, G2 of electrodes.

When the user's hand M has passed over the second set G2 and moves away from the detection device D, the impedance Z returns to its initial value Z0, which is that of the initial phase t0.

In FIG. 5, the NFC antenna A1 is connected to a third NFC antenna A3. This third NFC antenna A3 is positioned directly facing the second antenna A2 (see FIG. 3) and is preferably of the same size as said second antenna A2. This third NFC antenna A3 is therefore placed and designed so as to increase the electromagnetic coupling efficiency between the NFC antenna A1 and the antenna A2. This third antenna A3, which is optional, acts as a relay antenna between the NFC antenna A1 and the second antenna A2, and thus transmits any variation in frequency and/or impedance of the NFC antenna A1 to the second antenna A2.

This third NFC antenna A3 may prove to be necessary when the size and/or position of the NFC antenna A1 does not allow it to be positioned facing the second antenna A2, and does not allow efficient electromagnetic coupling between the two antennas. The addition of this third NFC antenna A3 then permits more efficient coupling. Evidently, this third NFC antenna A3 may be connected in series to the NFC antenna A1.

Figure 3:
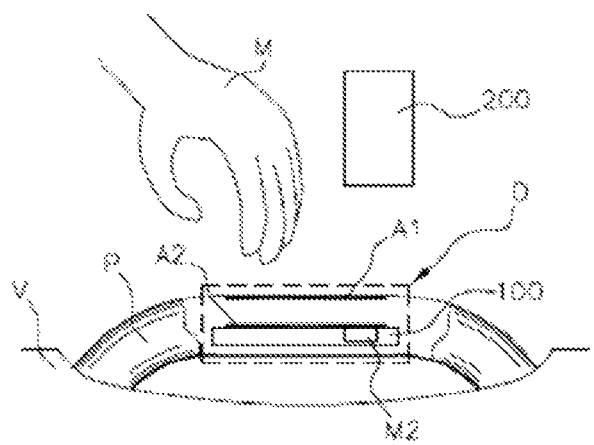
FIG. 3 is a schematic representation of a door handle of a vehicle comprising the detection device according to an aspect of the invention.

FIG. 3 shows a door handle P of a vehicle V comprising the detection device D according to an aspect of the invention. The modified NFC antenna A1 according to an aspect of the invention is preferably located on an inner surface of the handle, and the measurement means M2 are located on a printed circuit 100 incorporated in the handle P, the two antennas, namely the communication antenna A1 and the second antenna A2, preferably being located facing each other so as to create the an electromagnetic coupling that is as efficient as possible. If the coupling is not optimal, the third antenna A3 is placed facing the second antenna.

The NFC communication antenna A1 is preferably made of copper, so as to be flexible, and it can easily fit on the concave shape of the inner surface of a door handle P of a vehicle V.

It would also be feasible to place the constituent elements of the modified NFC antenna A1 on either side of a flexible printed circuit: for example, by etching the strips of subsets G1 and G2 of electrodes on one side of the printed circuit and etching the windings of the NFC antenna A1 on the other side of the printed circuit. Penetrating vias are then formed between the two elements, through the material of the printed circuit, to connect the strips to the windings. The flexible printed circuit is then bonded to an inner surface of the door handle P.

Thus the detection device D makes it possible to detect the approach of a portable user device 200 and the movement of a M in the proximity of the handle P, in order to unlock and lock the door by a sliding movement of the hand past the handle or past any other part of the bodywork (such as a rear-view mirror or a door pillar) in which the detection device is located.

Therefore, an aspect of the invention ingeniously makes it possible, by modifying the NFC communication antenna, to execute not only the detection of the approach of a portable user device but also the detection of the movement of a user's hand, by skillful use of the parasitic capacitance of the antenna, the value of which is variable and is increased by the modification of the layout of the NFC antenna which comprises offshoots in the shape of a comb, generating said increase in parasitic capacitance. An aspect of the invention is all the more remarkable in that the measurement of impedance is sufficient for detecting the movement of the hand and the approach of a portable user device, which was not possible in the prior art. Moreover, the proximity of the communication antenna, located at a distance from the measurement means but closer to the object to be detected, can result in more reliable detection and a degree of space saving which is not insignificant, since the communication antenna is remote and is no longer located on the printed circuit.

The invention claimed is:

1. A device for detecting the movement of part of a user's body and/or the approach of a portable user device, the device being intended to be placed on board a motor vehicle, the device comprising:
   a) a near field communication antenna configured for transmitting and receiving signals at a high frequency with a selected resonance between 3 and 30 MHZ, said antenna comprising at least one winding which is prolonged continuously in the form of at least two sets of strips, a first set and a second set being connected in parallel with said antenna, in such a way that said two sets each have a different variable capacitance and a different sensitivity, said antenna being capable of generating a different variation of impedance on the approach of part of a user's body towards the first or second set; and
   b) means for measuring, by electromagnetic coupling with said antenna, a variation of impedance or a variation of resonance frequency of said antenna, the measurement means having a series resonance frequency at the selected high resonance frequency and being capable of detecting the approach of a portable user device or the movement of part of a user's body taking place consecutively opposite the first and then opposite the second set of strips by means of the generated variation of impedance.

2. The detection device as claimed in claim 1, wherein said sets of strips each comprise two subsets of strips interconnected in the form of a comb.

3. The detection device as claimed in claim 1, wherein the winding delimits a perimeter inside which said antenna is prolonged continuously in the form of the at least two sets of strips, each comprising two subsets of interconnected strips, each in the form of a comb.

4. The detection device as claimed in claim 3, wherein, the perimeter being rectangular, the strips of the same set take the form of conductive metal tracks perpendicular to a length or a width of the perimeter.

5. The detection device as claimed in claim 1, wherein the strips of the same subgroup of a set are identical to each other.

6. The detection device as claimed in claim 1, wherein the strips of two subgroups of the same set are interleaved with each other.

7. The detection device as claimed in claim 1, wherein the two sets of strips differ from each other in at least one of a shape, a width, a length, or a thickness of the strips.

8. The detection device as claimed in claim 1, wherein the measurement means comprise a second antenna electromagnetically coupled to the communication antenna.

9. The detection device D as claimed in claim 8, comprises a third antenna connected in series to the communication antenna and electromagnetically coupled to the second antenna.

10. A door handle for a vehicle, comprising a detection device as claimed in claim 1.

11. A rear-view mirror of a motor vehicle, comprising a detection device as claimed in claim 1.

12. A door for a motor vehicle, comprising a detection device as claimed in claim 1.

13. A motor vehicle, comprising a detection device as claimed in claim 1.

* * * * *